UNITED STATES PATENT OFFICE.

GEORGE ESCOL SELLERS, OF SELLERS' LANDING, ILLINOIS.

IMPROVEMENT IN DISINTEGRATING AND SEPARATING VEGETABLE FIBERS.

Specification forming part of Letters Patent No. 41,538, dated February 9, 1864.

*To all whom it may concern:*

Be it known that I, GEORGE ESCOL SELLERS, of Sellers' Landing, Hardin county, in the State of Illinois, have invented certain improvements in the mode of disintegrating and separating vegetable substances so as to fit their fibrous and non-fibrous portions for use in the arts, of which the following is a specification.

The nature of my invention consists in treating fibrous vegetable substances, when in a green state or full of sap, by boiling under pressure, combined with the incidental advantage of the volatilization due to the steam-space in the boiler and the escape of the steam previous to or at the time of discharging the material from the boiler, so as to soften and prepare the non-fibrous portions for separation from the fibers and the fibers from each other by mechanical pressure, and thus to disintegrate or separate them with less injury than when separated by grinding, rubbing, or tearing apart, and to preserve the fibrous portions in their greatest integrity, and also to preserve the non-fibrous portions for use in the arts, which, when treated with alkalies or other solvents, are lost.

In order to render the process clear to any practical workman or person skilled in the art, I will describe the same and the manner I use it.

For the economical working of this process it is essential that the vegetable substance under treatment should be in a green state—that is, full of sap or fresh cut—as when the sap has been dried up or evaporated the ligneous portions of the plant become harder and more difficult to soften and require a much greater degree of heat, which is not only injurious to the fibers, but renders the non-fibrous portions more harsh and difficult to use. When woods such as the cotton-wood, bass, or other suitable woods are to be used they should first be reduced to small chips or shavings. I prefer such reduction to be made by my process of crushing in the line of the fiber, as described in the patent issued October 6, 1863, No. 40,217, as the fibers are by that process as thoroughly separated as they can be by mechanical means without serious injury, and are in a good condition to be operated on. When I use the cane (*Arundinaria macrosperma*) I prefer to use it as soon as possible after being cut, as this plant is always more or less filled with sap. Its best condition is, however, from August to January and in the second year of its growth. The plant matures in two years, but remains in a fair condition for use from the time of its maturity until the following fall, so that, in fact, with ordinary care cane may be cut at any season. The old and dead cane, as well as that of the first year's growth, should be avoided, or, if cut, should be sorted out to insure uniformity in the results by my process. I strip the cane of its branches then by a machine similar in construction to an ordinary straw-cutter, but proportionately stronger. I cut the cane into lengths of about two inches. In this condition it is placed in an ordinary boiler or digester and boiled in water or steam under a pressure of from sixty pounds to two hundred pounds per square inch, varying in pressure and length of time according to the state of the cane as to its maturity and its dryness. Ripe cane, full of sap, does not require a pressure of more than from sixty to one hundred pounds, and not over one hour of boiling, after it has been heated to the temperature due to that pressure to soften the non-fibrous portion of the plant thoroughly, and to produce in it a condition to render separation by pressure perfectly easy and without injury to the integrity of the fiber. Dead and dry cane not only requires greater heat, but longer boiling, two hundred pounds pressure not producing as good results on it as one hundred pounds on the green material. I find that a temperature due to one hundred pounds of pressure does not sensibly weaken the fiber of cane; but above that temperature up to two hundred pounds pressure there is a very sensible change, and above two hundred pounds a rapid destruction of the fiber. The same may be said in relation to straw, which, if cut before the grain is ripe and when the sap is flowing freely, may be thoroughly softened and disintegrated without the use of alkalies or other solvents than heat and moisture, and by a temperature as low as due to a pressure of sixty pounds to the square inch, and so much of the non-fibrous coloring-matter be removed that the fiber will readily bleach. After I have boiled the cane, as above described, I allow the steam to escape from the boiler, and with it such volatile portions of the sap as it will carry off. In this manner I avail myself of the volatilization, though not as effectually as by the process patented by me November 10, 1863, No. 40,576, which process for preparing fiber to be bleached I prefer. When this boiling or macerating process is used, and the fiber produced is designed to be bleached, better results are obtained by only partly filling the boiler with the material under treatment and allowing space for volatilization. The volatilized portions are then passed off by the escape of the steam. This also holds good when the material is boiled in water, as in proportion to the quantity of water used the portions of the plant that are difficult to bleach are removed, but not so effectually as by the steam boiling and washing. After the cane or other vegetable substance under treatment has been sufficiently softened, which is soon ascertained by experience and a knowledge of the nature and condition of the material, it is discharged from the boiler into a suitable vat, where it is kept at or about the boiling temperature. From this vat it is passed directly between crushing-rollers arranged in a set of three rolls, precisely similar to the rolls used for crushing sugar-cane. By these rollers it receives two successive pressures, the second greater than the first. This rolling or pressing, while the non-fibrous cementing material is in a soft, granular, and plastic state, spreads the fibers one from another, rupturing the cementing material without injury to the fibers. From the rollers it passes immediately into an ordinary washing-engine, where it is still kept at or near the boiling temperature by fresh supplies of hot water, and the non-fibrous portions are washed from the fibers and collected in the manner described in my above-mentioned Patent No. 40,576. In that patent I have called this non-fibrous matter "arundine," from its having been obtained by me in the greatest abundance from the cane; but when this material is obtained from any of the woods it should more properly be termed "lignine."

In the washing-engine care must be taken not to allow the bars in the roll and the plates in the bed to come in contact or near enough to break or destroy the fibers. If maceration and crushing between the rollers have been properly conducted, there is no use of any plates in the bed of the washing-engine, and a wooden block may take their place, as simple brushing and rubbing of the fibers against each other by the action of the beating-roll is sufficient as thoroughly to separate them and free them from the arundine or lignine, as this can be done by mechanical means without injury to the fibers.

In preparing fiber from wood, cane, or straw, or any other vegetable substances which yield short fibers of nearly uniform length, great care should be taken not to destroy that uniformity. Another important consideration, when the fiber is to be used for making paper, is its felting properties, which in short woody fiber are due to its perfect freedom from the ligneous portions of the plant and the preservation of the fine points or terminations of the ultimate fibers themselves. It is therefore of the utmost importance that the material should be obtained in that state to be most easily operated upon, and that in either steam-volatilizing, as described in my said Patent No. 40,576, or by maceration with such volatilization as is effected by the escape of the steam previous to or on discharging the material from the boiler, the heat and pressure in no case should be so great as to destroy the terminations or fine points of the fibers, which are so essential to their felting properties. High temperatures, when approaching a charring-heat, harden the non-fibrous portions and incrust the fibers with a harsh resinous matter, very difficult to remove without injury to the felting property of the fiber and a great waste of the material. A careful workman will therefore study the condition of the substance under treatment, and so regulate his temperatures and duration of time as to produce that state of the non-fibrous matter in which it loses most of its adhesive properties and assumes a fine granular form. In this condition it is most readily separated from the fiber, as above described, and the non-fibrous portions are then also in the best condition for use.

It is a well-established fact that paper manufactured from vegetable fiber by the natives of China and Japan in its unsized condition possesses greater strength in proportion to the length of the fiber than paper made in Europe or America. This is mainly due to the felting properties of the fibers as prepared by them. The paper beating or grinding engines not being used in those countries, their paper-stock approaches nearest to a pure unbroken celluline. The ligneous portions having been rendered soluble by boiling in caustic alkali in open vessels, the heat never having been raised to so great a degree as to injure the texture of the fibers, and the separation having been effected by simply pounding, the fibers have preserved their fine termini and retained their felting properties.

In my patent of November 10, 1863, No. 40,576, I have particularly described the process of steam-washing, volatilizing, and coagulating combined with crushing and tearing apart, and by washing separating the fibrous from the non-fibrous portions of the vegetable substance under treatment. By that process I have successfully disintegrated and separated hard seasoned woods—such as oak and walnut—and at temperatures so low as not to injure the fibers. Any green vegetable substance containing fiber can be reduced by maceration at a proper degree of heat, combined with the incidental volatilization effected by the escape of the steam either previous to or at the discharge of the material from the boiler, to a state in which the fibrous and non-fibrous portions may be loosened and disintegrated by pressure without injury to the fiber, and may be perfectly separated by washing, leaving the two products (fiber and lignin,) in a condition applicable to the arts. What I mean by pressure is the application of force to the material in such a manner as to spread the ultimate fibers one from another. This may be effected in various ways. For instance, a mass of material, properly prepared and softened, may be placed between two plates and direct pressure be applied. This, as the plates are forced together, will spread the fibers so as to separate them. The same thing may be done on large masses in a common press if there is space for the mass to spread. It is not necessary for the material to be in very thin layers. The pressure of one mass or aggregation of fibers against another is sufficient to separate or loosen them, so that they will become entirely separated in the washing-engine. I prefer, however, a pressure produced by passing through press-rollers previous to washing, as this is more uniform in action and produces the best practical results.

Any process that softens the non-fibrous portion of the plant and resolves it into grains or molecules has at the same time a softening effect on the fibers themselves, so that in the common beating-engine or any grinding or cutting process large portions of the fibers are ruptured, and instead of having their fine termini, so essential to felting, preserved intact, many of them are broken off and their fine points pass through the wire-cloth washers with the non-fibrous portions, and are thus lost as fiber.

Having thus described my process as to its object, nature, and theory of operation, what I claim as new, and desire to secure by Letters Patent, is—

1. The maceration of green vegetable substances under pressure from heat, combined with the incidental volatilization to prepare them for the separation of the fibers from each other and from the non-fibrous portions of the plant.

2. The loosening or disintegration by mechanical pressure of the fibers and of the non-fibrous matter, so that by washing a complete separation may be effected, and both the fibrous and the non-fibrous portions may be preserved in their greatest integrity.

3. The arundine or lignine, when separated from the celluline without other chemical agencies than heat and moisture, as a new article of commerce.

GEO. ESCOL SELLERS.

Witnesses:
WILLIAMS OGLE,
PHILIP W. PRICE.